No. 625,677. Patented May 23, 1899.
H. L. HEYMANN.
INSECT TRAP.
(Application filed Oct. 5, 1898.)
(No Model.)
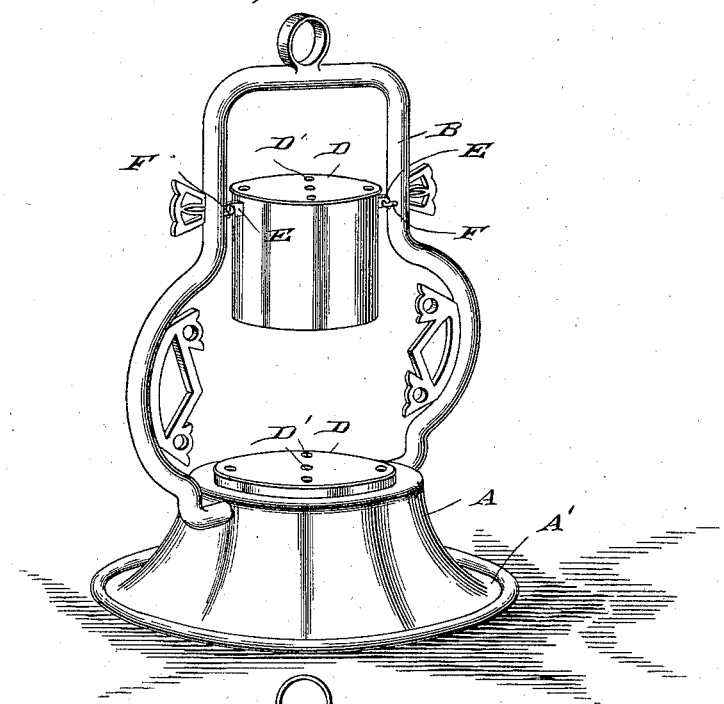
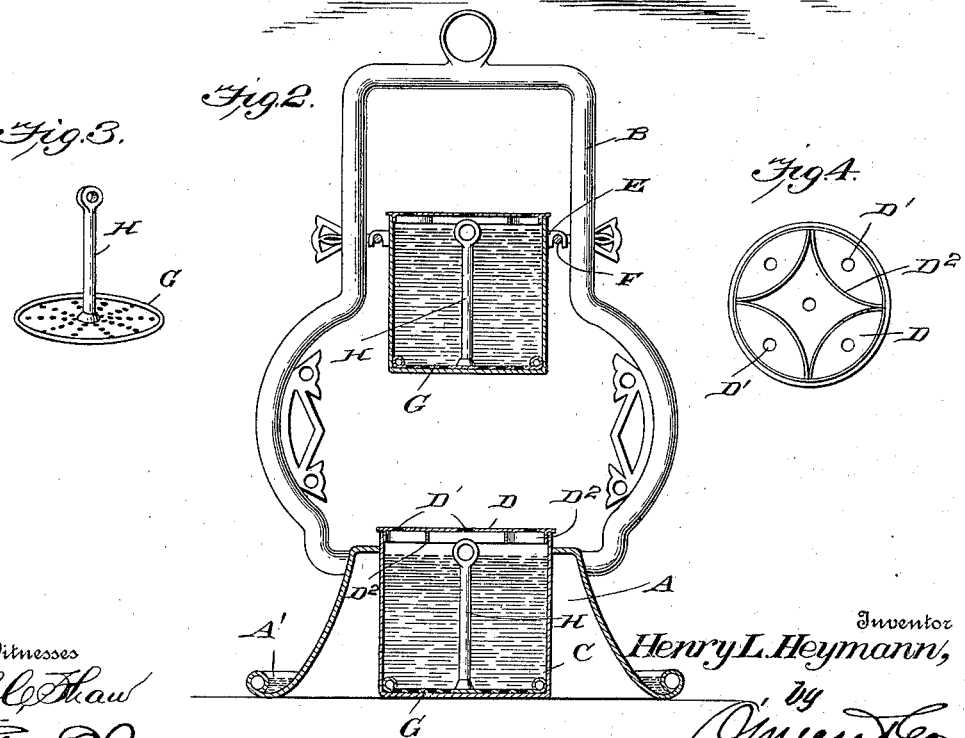
Witnesses
J. C. Shaw
Chas. P. Brock
Inventor
Henry L. Heymann,
by
O'Meara & Co.
Attorneys

UNITED STATES PATENT OFFICE.

HENRY LEOPOLD HEYMANN, OF NEW ORLEANS, LOUISIANA, ASSIGNOR OF ONE-HALF TO H. J. OSTENDORF, OF SAME PLACE.

INSECT-TRAP.

SPECIFICATION forming part of Letters Patent No. 625,677, dated May 23, 1899.

Application filed October 5, 1898. Serial No. 692,728. (No model.)

*To all whom it may concern:*

Be it known that I, HENRY LEOPOLD HEYMANN, a citizen of the United States, residing at New Orleans, in the parish of Orleans and State of Louisiana, have invented a new and useful Insect-Trap, of which the following is a specification.

This invention is a new and useful fly trap and destroyer, the object being to provide an exceedingly cheap and simple appliance capable of entrapping flies and other insects and destroying them, and another object of the invention is to provide means by which the destroyed insect can be quickly and easily removed from the trap, which can be reset without the necessity of replenishing either the bait or the destroying medium.

With these objects in view the invention consists, essentially, of a suitable base and frame adapted to receive and support one or more receptacles capable of containing a liquid, said receptacle or receptacles having a perforated top adapted to have the bait placed upon the under side thereof, and the entrapping-receptacle is also provided with suitable means for removing the flies without removing the destroying liquid.

The invention consists also in certain details of construction and novelties of combination, all of which will be fully described hereinafter, and pointed out in the claims.

In the drawings forming a part of this specification, Figure 1 is a detailed perspective view of a fly trap and destroyer constructed in accordance with my invention. Fig. 2 is a detailed sectional view, the supporting-frame being shown in elevation. Fig. 3 is a detailed perspective view of the remover, and Fig. 4 is a bottom plan view of the perforated top receptacle.

In carrying out my invention I employ a base A, which may be of any suitable material and also made any shape desired, said base being preferably constructed with an annular gutter or channel A', adapted to receive liquid for the purpose of preventing ants and other small insects from gaining access to the trap. A suitable supporting-frame B is attached to the base A and may be made after any suitable pattern and can be constructed integrally with the base or separate therefrom, as preferred. The base A is constructed to receive a cup-shaped receptacle C adapted to contain a liquid, said receptacle having a detachable cover D formed with a series of perforations D', and upon the under side of this cover are a series of flanges $D^2$, which serve to separate the perforations from each other, as most clearly shown in Fig. 4. A similar receptacle is supported within the frame B by means of hooks E, said hooks engaging staples F, forming a part of the supporting-frame, and this upper receptacle is provided with a perforated top the same as the lower one. A perforated disk G is adapted to rest within the receptacle, said disk being circular in shape and of a size to fit snugly within the receptacle and is provided with a lifting-rod H, said disk and rod constituting a remover for the purpose of removing the insects after they have been entrapped and destroyed.

In operation the parts are arranged substantially as shown in Fig. 2, the receptacles being nearly filled with water in which a considerable quantity of soap or other material has been dissolved. The removers are located in each receptacle and rest upon the bottom thereof. The bait, such as molasses, is smeared upon the under side of the top or cover, and said top or cover is then placed upon the receptacle, and after the upper and lower receptacles have been set in place the trap is ready for use. The flies will settle upon the top and pass through the perforations in order to gain access to the sweet bait, and in so doing fall into the water contained within the receptacle and in this manner are destroyed. After a number have been entrapped and destroyed the top is removed and the remover lifted, thereby removing all of the insects so destroyed, but leaving the destroying liquid in the receptacle, and after all of the insects have been removed in this manner from both the upper and lower receptacles the removers are replaced and the tops or covers set in place and the trap is again ready for use. By having the flanges extend across the bottom of the top or cover it will be impossible for an insect to pass in one opening and out through another.

It will thus be seen that I provide an exceedingly cheap, simple, and efficient construction of insect trap and destroyer which can be made in a variety of different sizes and shapes, and thereby prove ornamental as well as useful, and the advantages of the device will be apparent to every one skilled in the art to which it relates.

Having thus fully described my invention, what I claim as new, and desire to secure by Letters Patent of the United States, is—

1. An insect-trap comprising a base having its lower edge turned upon itself forming a receptacle or gutter adapted to contain liquid, a central opening adapted to receive an insect-destroying trap, a supporting-frame secured to said base and adapted to support one or more traps, substantially as shown and described.

2. An insect trap and destroyer, comprising a receptacle adapted to contain liquid, a perforated top having one or more separating-partitions upon the under side thereof, and a perforated disk having a lifting-rod attached thereto, all arranged and adapted to operate substantially as shown and described.

HENRY LEOPOLD HEYMANN.

Witnesses:
JEROME J. LANDRY,
FRANK R. COURTS.